United States Patent [19]
Chaput et al.

[11] 4,360,710
[45] Nov. 23, 1982

[54] TELEPHONE CIRCUIT

[75] Inventors: Guy J. Chaput, Ontario; Edward M. Sich, Ottawa, both of Canada

[73] Assignee: Northern Telecom Limited, Montreal, Canada

[21] Appl. No.: 190,902

[22] Filed: Sep. 25, 1980

[51] Int. Cl.³ .............................................. H04M 1/00
[52] U.S. Cl. ................................. 179/81 R; 179/84 R
[58] Field of Search ................ 179/81 R, 81 A, 84 R, 179/84 VF, 90 K

[56] References Cited
U.S. PATENT DOCUMENTS
4,303,805 12/1981 Synek et al. ...................... 179/81 R FOREIGN PATENT DOCUMENTS
2742623 4/1979 Fed. Rep. of Germany.
2917867 4/1980 Fed. Rep. of Germany.
1517429 7/1978 United Kingdom.
2021357 11/1979 United Kingdom.

*Primary Examiner*—Joseph A. Popek
*Attorney, Agent, or Firm*—R. J. Austin

[57] ABSTRACT

Telephone circuit using a transconductance switch in a high current line with the voice network, and a dial network in a low current line with the control input of the switch to provide dial input signals at the control input and send dial pulse signalling along the high current line through the voice network. The voice network includes a current clamp to stabilize the high current through the switch to the voice network sufficiently quickly to establish the desired waveform during dialling.

12 Claims, 3 Drawing Figures

4,360,710

TELEPHONE CIRCUIT

BACKGROUND OF THE INVENTION

1. Field of the Invention

This invention relates to telephone circuits.

2. Description of the Prior Art

In known telephone circuitry which uses electronic diallers, bipolar switches incorporated in the diallers have a high saturation resistance when driven by low base bias currents. This has resulted in an increase of up to 50 ohms in set resistance on 20 mA lines. Since linear devices have been required in the circuitry, problems with high AC loading of the voice network due to the circuits required to drive the dial switch have been encountered and these are difficult to surmount. Also, distortion problems occur in both the transmit and sidetone characteristics of voice networks. To overcome this, extra circuit elements are required in optimum bipolar line pulsing circuits and these elements require relatively large input control currents, i.e. in the range of 10% of the main or line current.

In addition, transitionized switching is usually used for dialling and is arranged so that the dialling signal bypasses conventional voice networks. This is because conventional voice networks are known to distort dialling wave forms and thus effectively alter the dialling signal.

SUMMARY OF THE INVENTION

According to the present invention, there is provided a telephone circuit comprising a solid state voice network, a transconductance switch in series in a high current line, with the voice network for dial pulse signalling through the voice network, and a dial network associated in a low current line with the control input of the transconductance switch to feed the control input at low current to provide dial input signalling at the control input. The voice network includes transmit, receive and sidetone voice circuits, and a current clamp to stabilize the high current through the transconductance switch to the voice network sufficiently quickly to establish the desired waveform during dialling.

With the above circuit, the transconductance switch requires a moderately high control voltage to operate, e.g. 2.5 volts or higher, and control is not dependent upon magnitude of current. Hence the dial network circuitry may be of simpler construction than has been possible previously. Also, the transconductance switch when closed is capable of conducting main current, e.g. from 0.02 to 0.1 amps, as the input required for the voice network. The transconductance switch may be a FET switch.

In practice, with the receiver "off-hook", the transconductance switch is part of an automatically closed circuit in which control voltage is supplied to the control input of the switch to close the switch for passage of the high current.

The transconductance switch control input is preferably in parallel with the control input of a power supply switch of the dial network.

The transconductance switch conveniently should be automatically closed, when a receiver of the telephone is "off hook" and before dialling commences, by a control voltage at low current supplied to the control input of the transconductance switch to cause high current to pass through the voice network. A control switch for the transconductance switch opens and closes the low current line to the control input of the transconductance switch to provide dial input signalling through the voice network and the control switch is controlled by the dial network. The control switch receives pulses from the dial network during dialling, closing the control switch during each pulse causing an interruption in the voltage to the control input of the transconductance switch and thus in the high current to the voice network, this period of interruption causing a corresponding pulse in the voice network.

The dial network in its simplest form includes an integrated circuit which sends pulses, upon dialling, to a control switch for the transconductance switch.

The dial network may also include a reset switch to reset the integrated circuit to await new dialling instructions when a telephone call is terminated.

The current clamp preferably comprises a filter and a current amplifier switch arrangement comprising a first switch which is a D.C. regulator transistor switch with a base in series with the filter, and at least a second transistor switch having its base controlled by direct current upon closing of the first switch to stabilize the current through the collector and emitter of the second switch and thus stabilize the high current through the transconductance switch to the voice network.

BRIEF DESCRIPTION OF THE DRAWINGS

One embodiment of the invention will now be described, by way of example, with reference to the accompanying drawings in which.

DESCRIPTION OF THE PREFERRED EMBODIMENT

In the embodiment, a telephone circuit (FIG. 1) comprises a voice network 10 in series with which is the drain of a transconductance switch which is a FET switch 11 otherwise known as a field effect transistor switch. The switch 11 is a line pulsing switch to effect dialling along a main or high current line 12 (0.02 to 0.1 amps) and through the voice network.

Figure 2:
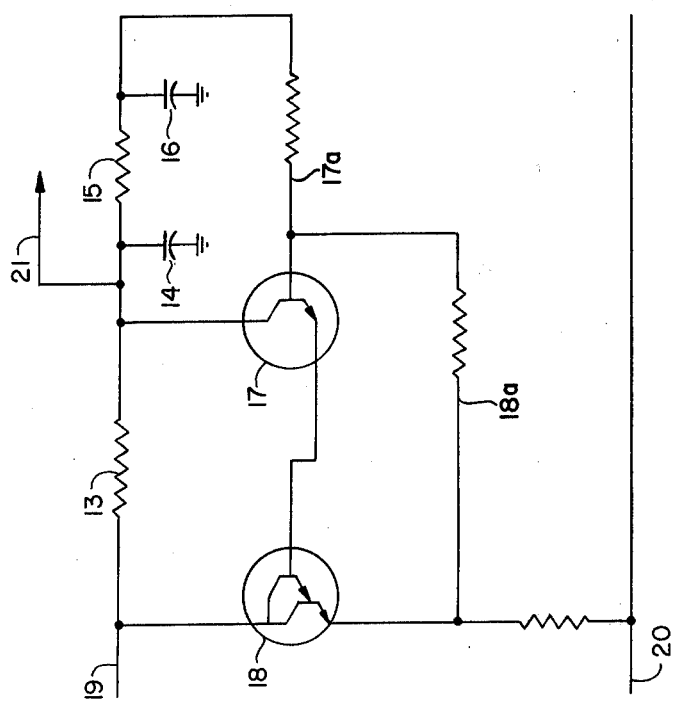
FIG. 2 is a current clamp incorporated in a voice network of the telephone circuit.

The voice network essentially includes a current clamp (FIG. 2) to quickly stabilize the main current through the source and drain of the transconductance switch and through the voice network to establish the desired waveform upon dialling. The current stabilization time is of the order of $10^{-3}$ second. The clamp also acts as a voltage regulator and defines the DC characteristics of the voice network. As shown by FIG. 2, the current clamp has a two section low pass filter comprising a resistance 13, capacitor 14, resistance 15 and capacitor 16. In this particular case, the resistances 13, 15 have values of 910 ohms and 20K ohms respectively and the capacitors have values of 47 $\mu$F and 4.7 $\mu$F respectively.

An NPN transistor switch 17 placed with its base in series and its collector in parallel with the capacitors 14, 16 has its emitter connected to the base of a Darlington Pair N-P-N transistor switch 18. A base bias network 17a, 18a is used for the switches 17, 18. Switch 17 is a DC regulator switch and biases switch 18 with DC current. The behaviour of switch 17 is based upon DC levels and will operate switch 18 to maintain a resistance between the lines 19, 20 such that current between the lines will be approximately constant. This resistance is in the order of 150 ohms to keep the telephone resistance low, and is independent of voltage values between the lines 19 and 20. The adjustment in resistance across lines 19 to 20 also holds the voltage approximately constant, i.e. from 3 to 4 volts DC along line 21 to other circuit parts. The switches 17 and 18 act together as an amplifier to provide the high line current of 0.02 to 0.1 amps along the line 21, while maintaining a high AC impedance, low DC resistance line, to give no distortion of the AC signals in the voice circuits.

Figure 1:
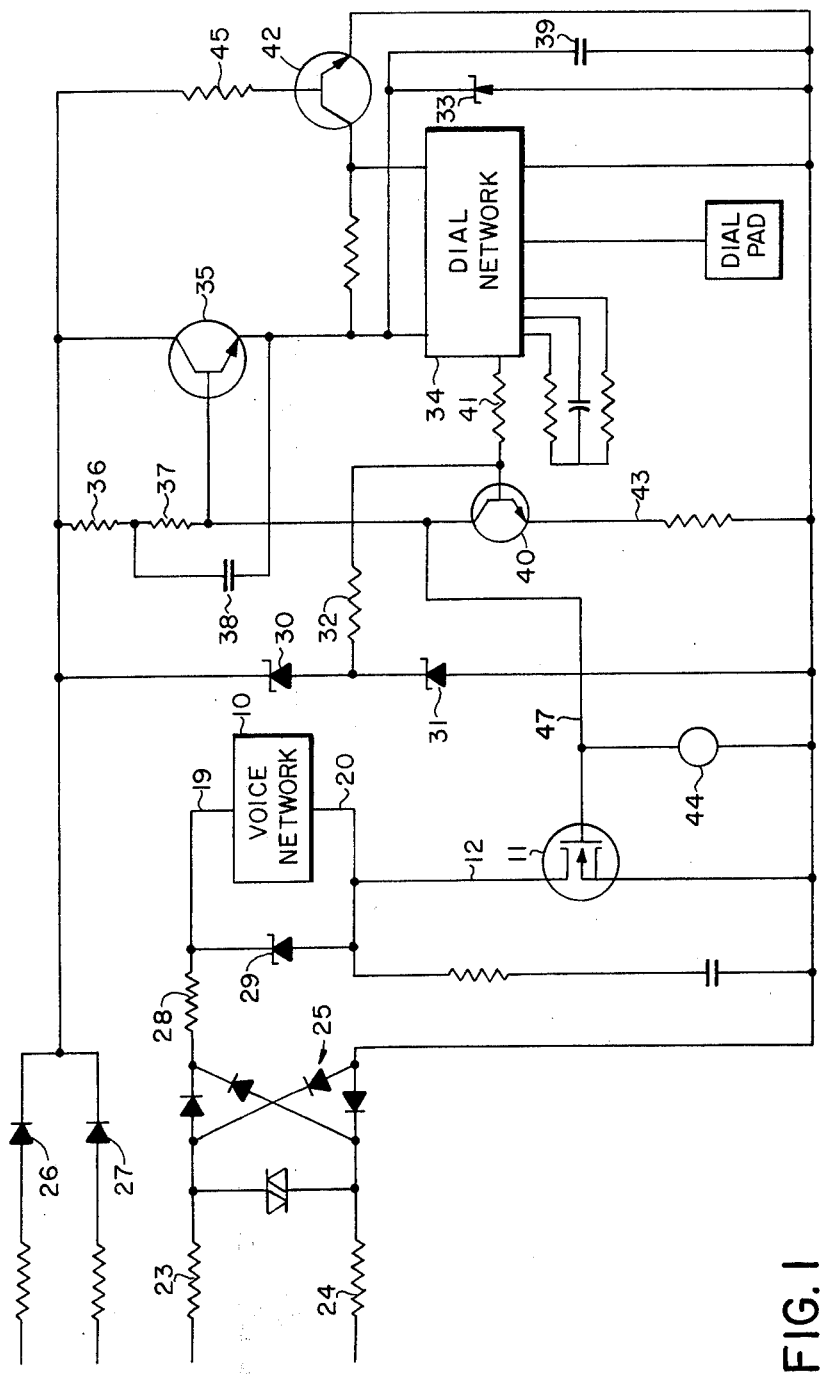
FIG. 1 is a telephone circuit.

To return to the circuit of FIG. 1, a conventional protection circuit is provided as will now be briefly discussed.

In FIG. 1, resistors 23 and 24 limit any surge currents on the line to a safe value for a varistor to handle. A polarity guard 25 ensures correct polarity of voltage to the voice network 10 and the FET switch 11. Two diodes 26, 27 ensure proper polarity on an integrated circuit of a dial network to be described, and also minimize voltage losses by bypassing one half of the polarity guard for the voice network. A resistor 28 and zener diode 29 protect the voice network integrated circuit during lightning surges and dial pulsing. The current through resistor 28 is limited to a specific value for a period (e.g. 1 amp for 5 microseconds) before FET switch 11 opens during surges to protect the voice network further. Two zener diodes 30, 31 and resistor 32 open FET switch 11 and stop the current surge as will be described. The diodes 30, 31 could be replaced by suitable resistors. Also the dial network is further protected by a zener diode 33 across its power supply.

Operation of the FET switch 11 is effected by the electronic dial network 34. The dial network includes an integrated circuit controlled by a dial pad. The integrated circuit requires about 2.5 volts at about $10^{-4}$ amps to operate and has its power supply provided by a power supply switch 35 which is an N-P-N type transistor with its control input in parallel with that of the FET switch 11 and also in parallel with the zener diodes 30 and 31. The power supply switch has two base bias resistors 36, 37 which prevent overload on the switch. From these resistors, a current of about $10^{-5}$ amps at 3 to 5.5 volts flows to the base of the switches 11 and 35.

The switch 35 is closed only when a path is provided for passage of current through the integrated circuit of the dial network 34. During dialling, the switch 35 is open when a dialling pulse is being transmitted from the dial network 34. The method of opening switch 35 is described below. As the integrated circuit of the dial network needs a continuous supply of power during dialling to function properly, then means are provided to guarantee this continuous provision of power. In this embodiment, this means comprises a capacitor 38, in parallel with the base of power supply switch 35, being charged by the resistor 36 whereby it may commence to be charged before the power supply switch is activated. A further capacitor 39 in series with capacitor 38 and in parallel with zener diode 33 is charged by capacitor 38, and capacitor 39 supplies power to the integrated circuit of the dial network when switch 35 is open.

The dial network also incorporates a reset switch 42 for the integrated circuit. This switch, which is a transistor switch (Q4), resets the dialler circuit when the receiver is placed on hook.

A control switch 40 is provided to open and close a low current line 47 to the control input of the FET switch 11 to provide dial input signalling through the voice network along the high current line 12. The control switch 40 is an N-P-N transistor switch having its emitter and collector in parallel with the bases of the FET switch 11 and the power supply switch 35. The control switch is itself controlled by the dial network, an output from which, through resistor 41 controls the base of the control switch.

Unless the switch 40 is closed by a dialling pulse received from the dial network, then the switches 11 and 35 are both base biased to pass current, respectively, to the voice network and to the integrated circuit of the dial network. Upon the switch 40 receiving a dialling pulse at its base, however, the switch closes thereby short circuiting the low current of $10^{-5}$ amps along line 43. This effectively interrupts the low current passing to the control inputs or bases of both switches 11 and 35 thereby opening these switches.

The resistor 32 is connected to the base of the control switch in parallel with the resistor 41. If a lightning or other surge passes through the circuitry, it will pass through the zener diodes 30, 31 upon reaching a predetermined voltage, and current passing through resistor 32 closes control switch 40 and thereby opens switches 11 and 35 during the whole period of the surge. Thus switches 11 and 35, the voice network, and dial network are effectively protected against such surges. Closing of switch 40 also opens switch 42 and diverts current from the capacitors 38, 39.

A hook switch 44 lies in parallel with the control inputs of the FET switch 11 and the power supply switch 35 and is part of the low current line of $10^{-5}$ amps. As the hook switch is in a low current line, it is conveniently a switch of simple design and construction, e.g. a pair of simple contacts closed and opened by movement of the telephone receiver onto and off hook.

In use, with the receiver on hook, the circuitry passes no current with the hook switch 44, closed, to cut off any current from the control input of the FET switch 11. At this stage, the integrated circuit of the dial network is in a reset position in which any previous call has been cancelled.

Upon removing the receiver (off-hook), the hook switch 44 opens and high voltage (3 to 5.5 volts) at low current (about $10^{-5}$ amps) is immediately applied through resistors 36, 37 and to the control input of the FET switch 11. The switch 11 is thus closed and the high main current is thereby passed through the source and drain of switch 11 and through the voice network to produce a dialling sound.

Upon opening of the hook switch, high voltage at low current also passes to the base of the power supply switch 35 to close the switch and provide current to the integrated circuit. The capacitor 38 becomes charged and in turn this charges capacitor 39. Current through a base bias resistor 45 closes the reset switch 42 thus producing zero voltage at the appropriate point in the integrated circuit to prepare the circuit for dialling.

Upon dialling, dialling pulses proceed from the dial network to the base of control switch 40. As each pulse is received by switch 40, the high voltage which has been provided at the control input of the FET switch 11 and the power supply switch 35 is short circuited to ground through line 43, thereby opening these switches. Hence, each pulse produced upon dialling is reproduced through the voice network by a corresponding length interruption in current along the high current line through the FET switch. While switch 35 remains open, power is maintained in the integrated circuit of the dial network by capacitor 38 assisted by capacitor 39. These capacitors are recharged between pulses to control switch 40 when the switch 35 is again closed.

After completion of a call and upon replacing the receiver into the on hook position, the reset switch 42 senses the line voltage and opens to reset the integrated circuit of the dial network to the reset position to enable a subsequent call to be made.

As may be seen from the above embodiment, with the use of a transconductance switch, with its control input in a high voltage, low current line, connected to the voice network by the main high current line, circuitry associated with the dialling network is of simpler construction than has been found practicable with conventional telephone circuits.

Also, as is shown above, the dialling signalling is passed through the voice network thus further increasing the simplicity of the circuitry design.

Further, it is clear from above that the transconductance switch has three functions. It acts as a line switch and also as a dial switch to reproduce the dialling pulses through the voice network. Further, it acts as lightning protection for the voice network in that it opens when a lightning surge passes through zener diodes 30, 31 and resistor 32 to the control switch 40.

With the use of such a low current line, e.g. less than $10^{-5}$ amps on the control side of the transconductance switch, it is also possible to incorporate a hook switch in this line and in which the hook switch design is of much simpler and smaller construction than is made possible when a hook switch is incorporated in higher current lines according to current practice.

Figure 3:
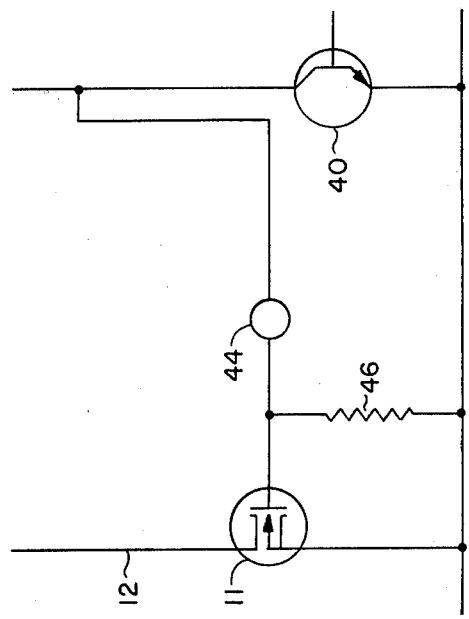
FIG. 3 is part of a telephone circuit forming a modification of the circuit of FIG. 1.

In a modification of the embodiment shown in FIG. 3, the hook switch 44 is changed in position to lie in series with the control input of the FET switch. In this case, with the receiver "on hook", the hook switch is held open to cut off current to the control input of the FET switch. Removal of the receiver closes the hook switch to apply current at the control input of the FET switch. In this arrangement, a resistor 46 is used in parallel with the base of switch 11 to ensure that the base is returned to zero voltage while the hook switch is open. The resistor may be about $10^{-5}$ ohms resistance.

What is claimed is:

1. A telephone circuit comprising a solid state voice network, a transconductance switch in series in a high current line with the voice network for dial pulse signalling through the voice network, and a dial network associated with the control input of the transconductance switch to provide low current dial pulse signalling at the control input, and the voice network includes a current clamp to stabilize the high current through the transconductance switch and the voice network to establish a desired loop signal waveform during dialling.

2. A circuit according to claim 1, wherein the transconductance switch is a FET switch.

3. A circuit according to claim 1, wherein the dial network includes an integrated circuit which sends pulses upon dialling for operation of the transconductance switch.

4. A circuit according to claim 3, wherein the transconductance switch is provided with a control switch to open and close the low current line to the control input of the transconductance switch to provide dial input signalling through the voice network, and the control switch is itself controlled by the dial network.

5. A circuit according to claim 4, wherein the transconductance switch is closed when a receiver of a telephone is "off hook" and before dialling commences, control voltage in the low current line is supplied to the control input of the transconductance switch whereby high current passes through the transconductance switch and the voice network, and the control switch is operable to receive pulses from the dial network during dialling, closing of the control switch during each pulse causing an interruption in the low current to the control input of the transconductance switch and thus in the high current to the voice network to create a corresponding pulse in the voice network.

6. A circuit according to claim 5, provided with an integrated circuit in the dial network and a power supply switch to the integrated circuit, the power supply switch having a control input to close the power supply switch when the control switch is open, closing of the control switch during each pulse causing an interruption in current to the control input of the power supply switch so as to open it, the circuit also including a capacitor chargeable when the power supply switch is closed and capable of releasing charge, when the power supply switch is open, to the integrated circuit of the dial network to ensure that the dial network is provided with continuous power during dialling.

7. A circuit according to claim 5, including means to protect the voice network and the dial network from lightning surges during pulsing, said means connected to the base of the control switch to effect closing of the control switch during a lightning surge to cause opening of the power supply switch and opening of the transconductance switch.

8. A circuit according to claim 4, wherein the control switch is an NPN transistor switch with its base current controlled by the dial network and its collector and emitter in parallel with the base of the transconductance switch.

9. A circuit according to claim 1, wherein the current clamp comprises a filter and a current amplifier switch arrangement comprising a first switch which is a DC regulator transistor switch with a base in series with the filter, and at least a second transistor switch having its base controlled by direct current upon closing of the first switch to stabilize the current through the collector and emitter of the second switch and thus stabilize the high current through the transconductance switch to the voice network.

10. A circuit according to claim 1, provided with a hook switch which is disposed in a low current line associated with supply and cut-off of current to the control input of the transconductance switch.

11. A circuit according to claim 10, wherein the hook switch is disposed in parallel with the control input of the transconductance switch and is in a closed position when a receiver is "on hook" to short circuit the control input of the transconductance switch and is in an open position when the receiver is "off hook".

12. A circuit according to claim 10, wherein the hook switch is disposed in series with the control input of the transconductance switch and is in an open position when a receiver is "on hook" to disconnect the control input of the transconductance switch and is in a closed position when the receiver is "off hook".

* * * * *